March 2, 1937.  O. VON KORIES  2,072,611
CYCLE POWER UNIT
Filed Nov. 11, 1935  3 Sheets-Sheet 2

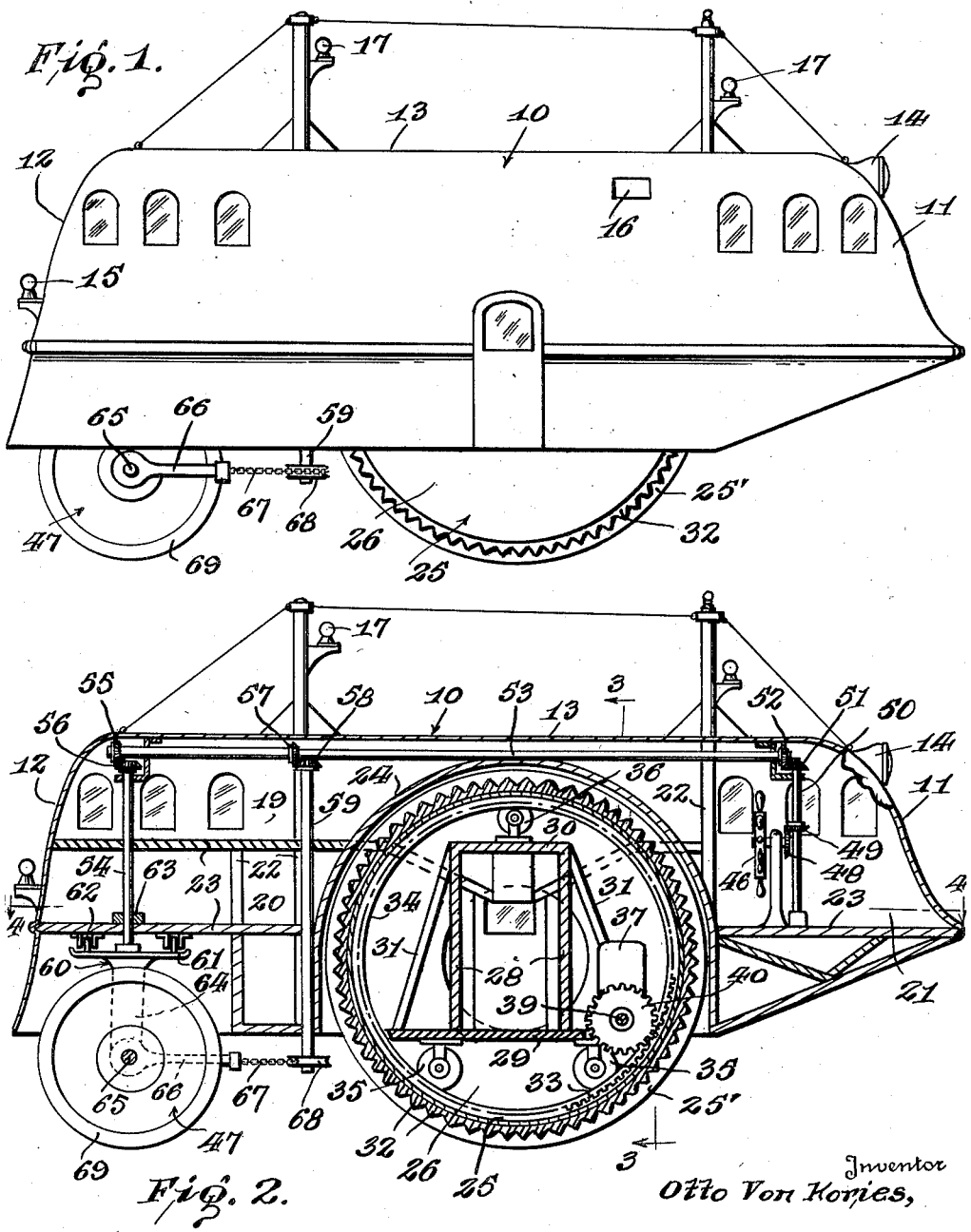

Otto Von Kories, Inventor

By Christian L. Nielsen, Attorney

March 2, 1937.  O. VON KORIES  2,072,611
CYCLE POWER UNIT
Filed Nov. 11, 1935  3 Sheets-Sheet 3

Inventor
Otto Von Kories,
By Christian R. Nielsen,
Attorney

Patented Mar. 2, 1937

2,072,611

UNITED STATES PATENT OFFICE 2,072,611

CYCLE POWER UNIT

Otto Von Kories, Los Angeles, Calif.

Application November 11, 1935, Serial No. 49,285

2 Claims. (Cl. 115—19)

My invention relates to cycle power units and it consists in the constructions, arrangements and combinations herein described and claimed.

It is the cardinal object of the invention to provide a power unit which may be readily built into a suitable structure of transportation, whether it be a water craft or land vehicle, and embody all safety factors possible.

It is also an important object of the invention to provide a novel traction means whereby full energy of the power plant is employed.

It is a still further object of the invention to provide a conveyance in which a rotary propeller drum is inherent, and which cooperates with a novel rudder, the latter in certain situations assisting in support of the conveyance.

A still further object of the invention resides in the novel design and structural details making it possible to produce a conveyance of light weight, well balanced, and having a wide range of uses.

Additional objects, advantages and features of invention will be apparent from the following description considered in conjunction with the accompanying drawings, wherein Figure 1 is a side elevation of a ship constructed in accordance with my invention.

Figure 2 is a longitudinal sectional view thereof.

Figure 3:
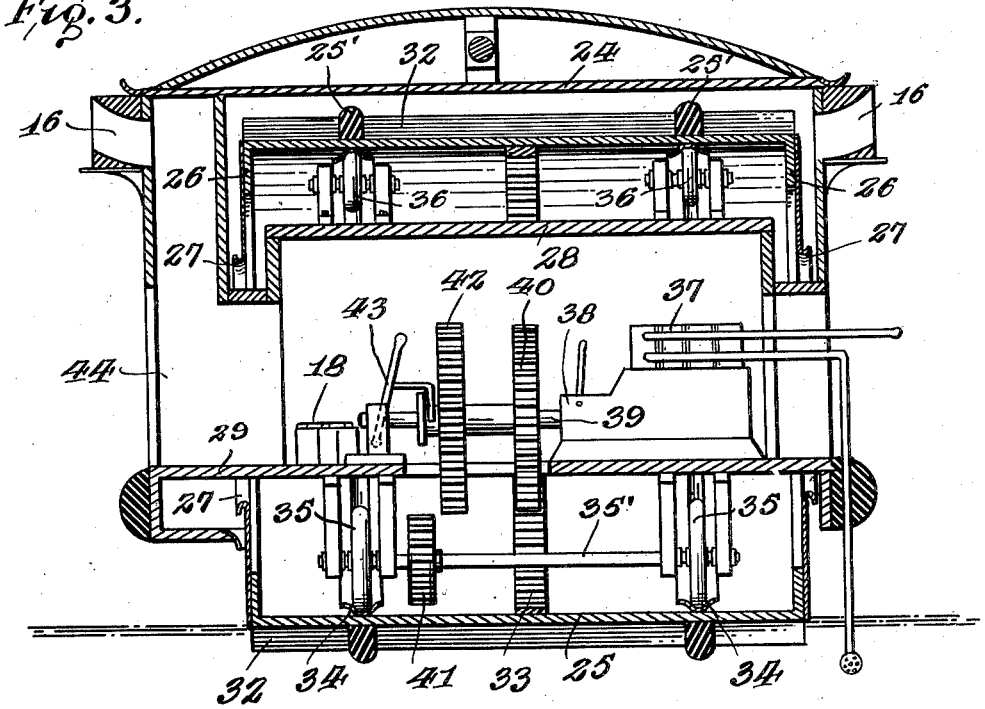
Figure 3 is an enlarged cross sectional view taken on the line 3—3 of Figure 2.
Figure 4:
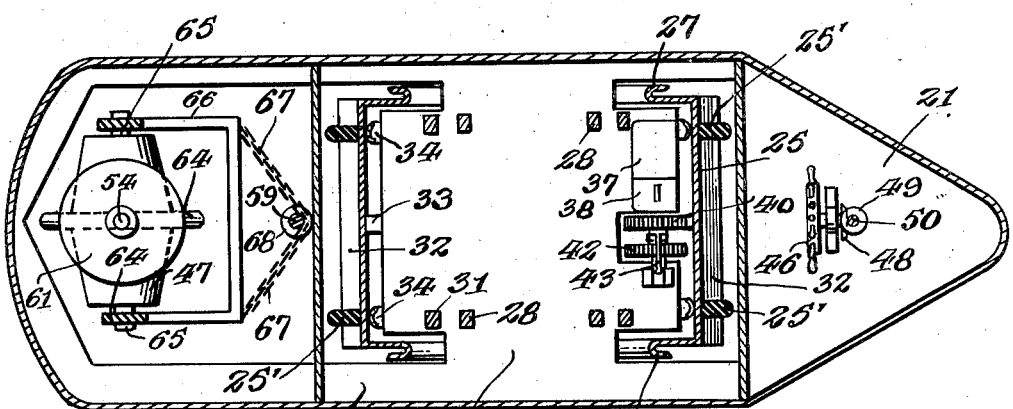
Figure 4 is a longitudinal sectional view on the line 4—4 of Figure 2.

Attention is first invited to Figures 1 to 4 wherein there is shown a craft 10 which is of ship-like appearance having a bow 11 and stern 12, although unlike a ship, the craft is completely enclosed from bow to stern, as indicated at 13, and preferably this surface is streamlined throughout, thus offering the least possible resistance to forward movements. The craft will, of course include headlights 14, stern lights 15, and mast lights 17, which derive their source of energy from the storage batteries 18.

The craft 10 will include a passenger compartment 19, as well as freight compartment 20, and pilot house 21, and of course the interior structure defining these several compartments will include suitable beams and struts 22 for reinforcing and supporting floors 23.

Intermediate the length of the craft 10 there is a semicircular opening defined by a housing 24, within which there is revolubly mounted a rotary propeller drum 25. The housing 24 extends transversely of the craft from the bottom upwardly into the craft structure.

The drum 25 has inwardly disposed flanges 26 at each end, and circumscribing these flanges there is a water-shedding rim 27 which functions to discharge water from the drum to the exterior of the craft. The drum 25 also has a pair of rims 25', one being positioned adjacent each end thereof which function in overland transportation as will be explained.

A sub-frame 28 is mounted upon the floor 29 of the craft, the frame being positioned within the drum, and in the present instance, comprises uprights and transverse beams 30, suitable struts 31 being employed as found necessary to afford the necessary rigidity to the framing 28, and proper securement to the floor 29. The sub-frame 28 revolubly supports the drum 25 as will be explained hereinafter.

The drum 25 is preferably formed from a suitable gauge of sheet metal throughout the circumference of which there are corrugations 32 extending transversely thereof and from one end of the drum to the other. These corrugations may be formed as an integral part of the drum as shown, or they may be made separately and then suitably secured to the drum, according to best machine practice. A drive gear ring 33 is fixed intermediate the length of the drum upon the interior thereof, and adjacent the ends of the drum, and upon the interior, annular trackways 34 are secured.

The floor 29 has mounted upon the under side, guide wheels 35, positioned so as to be disposed in respective trackways 34, and upon the transverse beam 30 a guide wheel 36 is mounted and aligned with and disposed in respective trackways 34. From the foregoing, it will be seen that the wheels 35—36 revolubly support the drum, and as the trackways snugly abut the sides of the wheels, lateral movement of the drum will be obviated.

A Diesel engine 37 is mounted on the floor 29 and includes a suitable transmission mechanism 38, for effecting movement of the craft at various speeds forward as well as reverse. A drive shaft 39 has keyed thereon a gear 40 positioned to mesh constantly with the ring gear 33 and obviously with rotation of the gear 40 by the engine, the drum 25 will be rotated. It is also contemplated to drive the drum 25 through the wheels 35, and therefore the wheels 35 will be fixed to the shaft 35'. A gear 41 is keyed to the shaft 35', and a shiftable gear 42 associated with the gear 40 on the shaft 39 is adapted to mesh therewith, the gear 42 being manually shifted through the lever and link mechanism 43. This will permit either the use of the gear 40 or 42 as the driving factor, and in the latter event, rotation of the drum would be through frictional contact between the wheels 35 and the guide tracks 34.

A passageway 44 is provided in the craft structure extending lengthwise of the body, this passage-way being built in the craft in a side opposite the engine and in this way the weight of the engine will be counterbalanced.

In the forward end of the craft, a pilot room 21 is shown, which of course will include the necessary navigation instruments (not shown), and also houses a pilot wheel 46 for control of the rudder 47 for effecting steerage of the craft, which will be understood from the following description. The pilot wheel 46 is suitably mounted and includes a gear 48 in mesh with a gear 49 fixed to an upright shaft 50. The shaft 50 is suitably journalled and at its upper end there is a gear 51 in mesh with a gear 52 fixed to a longitudinally extending shaft 53. The shaft 53 extends rearwardly to a point slightly beyond a vertically disposed rudder shaft 54. These shafts 53—54 have gears 55—56, respectively, which are in mesh, and the shaft 53 further includes a gear 57 in mesh with a gear 58 fixed to the vertically disposed shaft 59. The shaft 59 may be journalled in any suitable manner and is positioned in advance of the rudder, and functions in conjunction with other mechanism, presently to be described, for control of the rudder.

The rudder 47 comprises a mounting 60 having a circular plate 61 positioned beneath the lower floor 23, defining a raceway for rollers 62 mounted upon the underside of the floor 23. The shaft 54 is rigidly connected centrally of the plate 61, and extends upwardly through the floor, suitable thrust bearings 63 being employed where necessary, for retaining the plate 61 in snug engagement with the rollers 62. The mounting 60 comprises a pair of legs 64 between which the rudder 47 is mounted upon an axle 65. A yoke 66 extends forwardly from the legs 64 and at respective corners of the yoke there is attached a draw chain 67 the intermediate portion of which is wound upon a drum 68 keyed to the shaft 59. From the foregoing, it will be readily understood that upon rotation of the pilot wheel 46 motion will be imparted to the shafts 50, 53, 54, and 59, which in turn will impart movement to the rudder 47, effecting steerage of the craft. The rudder 47 comprises an annular rim 69 which projects a substantial distance beyond the circumference of the rudder body, and when used, as a water craft, the rim will act as an ordinary rudder, but when the craft is employed in overland transportation the rim 69 functions as a supporting means, and still retains its steering functions.

In use of the device as a watercraft, the structure will be readily floatable, the drum resting upon the surface of the water, and upon rotation of the drum through the gear 40 and ring gear 33 or the gears 41—42, the corrugations 32 of the drum will impinge upon the water effecting propulsion of the craft, the speed of rotation of the drum being controlled through the speed transmission 38. The drum 25 it should be noted is supported upon its periphery by the rollers 35—36 and therefore the least possible friction is encountered. Steerage of the craft is effected through the pilot wheel 46, which controls the setting of the rudder 47.

The craft may also be used upon land without alteration or change, and in such case, the rims 25' will engage the ground, as will the rim 69 of the rudder 47. The corrugations 32 will afford traction, since they will bite into the earth, and the pulling power of the craft will be great, making it susceptible to use as a "towing means" for other vehicles.

Figure 5:
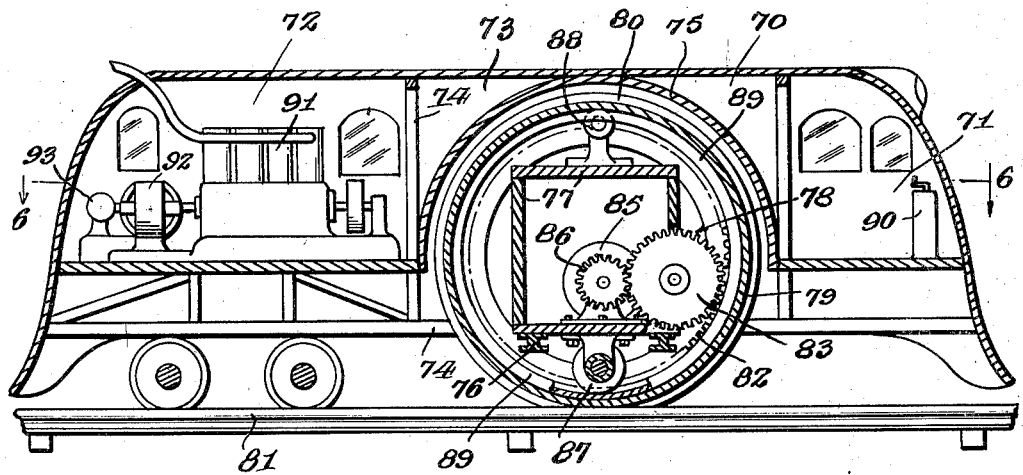
Figure 5 is a longitudinal sectional view of an electric locomotive constructed in accordance with my invention.
Figure 6:
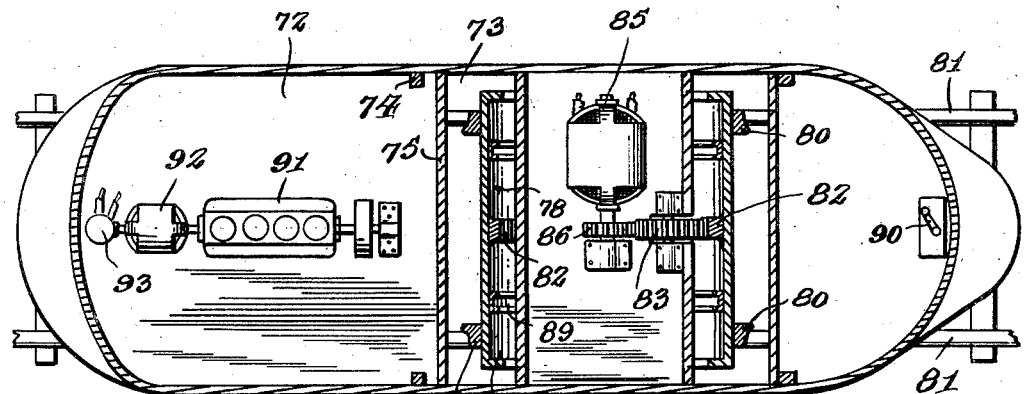
Figure 6 is a longitudinal sectional view on the line 6—6 of Figure 5.

In Figures 5 and 6, I have illustrated formally an electric locomotive 70, having a driver's cabin 71 and engine room 72. Between the cabin 71 and the engine room 72, a drive unit compartment 73 is formed, defined by suitable framing 74, and semi-circular guard plate 75. Transversely of the floor framing 74, I-beams 76 are mounted upon which a sub-framing 77 is erected, which in the present instance is of rectangular formation. The sub-framing 77 is therefore built in as an integral part of the framing 74 and serves as a support means for a drive unit, generally indicated at 78, which will now be described.

The drive unit 78 is in the form of a cylindrical drum 79, upon the outer periphery of which there are rims 80, spaced so as to engage respective rails 81, and upon the interior of the drum there is formed a ring gear 82 which meshes with a gear 83 suitably mounted upon the floor 84 of the sub-frame. A variable speed motor 85 is provided upon the shaft of which there is a gear 86 in mesh with the gear 83. The drum 79 is revolubly supported upon the sub-frame 76, in the present instance, a single lower roller 87 and an upper roller 88 being employed, each roller traversing a guide channel 89, secured upon the inner periphery of the drum. From the construction thus far described, it will be apparent that upon energization of the motor 85, rotary motion will be imparted to the gears 86—83 and ring gear 82, with consequent rotation of the drum 79 causing the drum to traverse the tracks 81. The motor 85 will be controlled through the control box 90, as is customary, the circuits of which are not illustrated since these form no part of the invention.

A suitable type of internal combustion motor 91 is housed within the engine room 72, the drive shaft of which actuates a generator 92 and exciter 93. The engine 91 and generator 92 produce the current for operation of the motor 85, lighting and any other current which may be required in the operation of the locomotive and cars associated therewith.

I have shown a single variable speed motor 85, but it will be understood that a pair of motors may be employed, namely a high speed motor and a low speed motor, in which event separate control means would be required for each motor.

While I have shown and described my power unit as applied to traction means, it is not so limited, and it is contemplated that the underlying principles may be found highly efficient in other situations such as in generation of electric power by suitably mounting the power unit in a flowing stream of water. I therefore consider as my own all such modifications in structure, as fairly fall within the scope of the appended claims.

I claim:—

1. In a watercraft, a floatable body, a drum extending transversely of the body and of a diameter to project below the bottom of the body, said drum having corrugations upon its exterior surface extending transversely thereof, means upon the interior of the drum for revolubly supporting and driving the drum, a shaft extending longitudinally of the body, said shaft having a gear mounted upon respective ends thereof, a vertically disposed shaft at the fore and aft portions of the craft, a gear on said shafts in mesh with the gears on the longitudinally extended shaft, manual means for rotating the shaft at the fore part of the craft, a rudder carriage carried on the free end of the shaft at the aft portion of the craft, a ball race on the carriage complemental to bearing members on the body, a substantially cylindrical rudder on the carriage, said rudder having an annular rim projecting beyond the periphery thereof, a yoke on the carriage, a vertically disposed shaft carried by the body, said shaft having a gear at its upper end, a gear on the longitudinal shaft in mesh therewith, said vertically disposed shaft having a drum at its lower end, and flexible cable means between the drum and yoke.

2. In a land or watercraft, a floatable body having a semicircular opening extending transversely thereof, a rotatable cylindrical propeller drum disposed within the opening, a frame structure within the drum and integrally connected with the body, guide channels upon the interior of the drum, a ring gear upon the interior of the drum, guide wheels upon the frame structure and disposed within respective guide channels, a shaft connecting a pair of said wheels, a motor upon the frame structure, a shaft driven thereby, said shaft having a gear in mesh with the ring gear, a gear on the shaft of the guide wheels, a second gear on the motor shaft, said gear being shiftable into meshed engagement with the gear on the shaft of the guide wheels whereby to positively drive said wheels, a revoluble rudder on the craft, means for oscillating said rudder, and said drum and rudder having annular rim members defining traction surfaces.

OTTO VON KORIES.